(12) United States Patent
Beauchesne-Martel et al.

(10) Patent No.: US 11,299,286 B2
(45) Date of Patent: Apr. 12, 2022

(54) SYSTEM AND METHOD FOR OPERATING A MULTI-ENGINE AIRCRAFT

(71) Applicant: PRATT & WHITNEY CANADA CORP., Longueuil (CA)

(72) Inventors: Philippe Beauchesne-Martel, Brossard (CA); Patrick Manoukian, Saint-Laurent (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 342 days.

(21) Appl. No.: 16/670,582

(22) Filed: Oct. 31, 2019

(65) Prior Publication Data

US 2020/0361620 A1  Nov. 19, 2020

Related U.S. Application Data

(60) Provisional application No. 62/852,428, filed on May 24, 2019, provisional application No. 62/848,699, filed on May 16, 2019, provisional application No. 62/848,237, filed on May 15, 2019.

(51) Int. Cl.
*B64D 31/00* (2006.01)
*B64D 31/10* (2006.01)
*B64C 27/12* (2006.01)
*B64C 27/57* (2006.01)
*B64D 35/08* (2006.01)

(52) U.S. Cl.
CPC .............. *B64D 31/10* (2013.01); *B64C 27/12* (2013.01); *B64C 27/57* (2013.01); *B64D 35/08* (2013.01)

(58) Field of Classification Search
CPC ........ B64D 31/10; B64D 35/08; B64C 27/12; B64C 27/57
See application file for complete search history.

(56) References Cited

U.S. PATENT DOCUMENTS

| | | | |
|---|---|---|---|
| 4,137,707 | A | 2/1979 | Wanger |
| 5,189,620 | A | 2/1993 | Parsons et al. |
| 5,363,317 | A | 11/1994 | Rice et al. |
| 6,422,023 | B1 | 7/2002 | Dudd, Jr. et al. |

(Continued)

FOREIGN PATENT DOCUMENTS

EP  2631172  8/2013

*Primary Examiner* — Ian Jen
(74) *Attorney, Agent, or Firm* — Norton Rose Fulbright Canada LLP (57) ABSTRACT

The present disclosure provides methods and systems for operating a rotorcraft comprising a plurality of engines configured to provide motive power to the rotorcraft and at least one rotor coupled to the plurality of engines. Failure of an active engine of the rotorcraft is detected when the rotorcraft is operated in an asymmetric operating regime (AOR), in which at least one first engine of the plurality of engines is the active engine and is operated in an active mode to provide motive power to the rotorcraft and at least one second engine of the plurality of engines is a standby engine and is operated in a standby mode to provide substantially no motive power to the rotorcraft. At least one flight control input is adjusted to compensate for a reduction in rotational speed of the at least one rotor resulting from the failure of the active engine. An increase in a power output of the standby engine of the rotorcraft is commanded.

20 Claims, 7 Drawing Sheets

(56) References Cited

U.S. PATENT DOCUMENTS

| | | | |
|---|---|---|---|
| 6,655,631 B2 * | 12/2003 | Austen-Brown | B64D 25/00 |
| | | | 244/12.4 |
| 7,976,310 B2 | 7/2011 | Bachelder et al. | |
| 9,038,939 B2 | 5/2015 | Dyrla et al. | |
| 9,352,831 B2 | 5/2016 | Schaeffer | |
| 9,463,874 B2 | 10/2016 | Vallart et al. | |
| 9,567,091 B2 | 2/2017 | Schaeffer et al. | |
| 9,676,490 B2 | 6/2017 | Vallart et al. | |
| 9,729,096 B2 | 8/2017 | Edwards | |
| 9,890,708 B2 | 2/2018 | Borchers et al. | |
| 9,926,075 B2 | 3/2018 | Vallart | |
| 9,969,488 B2 | 5/2018 | White et al. | |
| 10,065,734 B2 | 9/2018 | Worsham, II et al. | |
| 10,173,787 B1 | 1/2019 | Oltheten et al. | |
| 10,214,296 B2 | 2/2019 | Mercier-Calvairac et al. | |
| 10,252,813 B2 | 4/2019 | Casolaro et al. | |
| 10,253,699 B2 | 4/2019 | Thiriet et al. | |
| 10,287,026 B2 | 5/2019 | Covington et al. | |
| 10,329,028 B2 | 6/2019 | Abbas et al. | |
| 10,337,409 B2 | 7/2019 | Bedrine et al. | |
| 10,371,062 B2 | 8/2019 | Marconi et al. | |
| 10,392,105 B2 | 8/2019 | Schaeffer et al. | |
| 10,415,482 B2 | 9/2019 | Marconi et al. | |
| 10,422,285 B2 | 9/2019 | Thiriet et al. | |
| 2013/0219905 A1 | 8/2013 | Marconi | |
| 2016/0311548 A1 | 10/2016 | Thiriet et al. | |
| 2017/0101938 A1 | 4/2017 | Lescher et al. | |
| 2017/0152055 A1 | 6/2017 | Mercier-Calvairac et al. | |
| 2017/0327241 A1 | 11/2017 | Mitrovic et al. | |
| 2018/0135535 A1 | 5/2018 | Wulff et al. | |
| 2018/0201386 A1 | 7/2018 | Strauss et al. | |
| 2019/0055004 A1 | 2/2019 | Schaeffer et al. | |
| 2019/0135411 A1 | 5/2019 | Gonzalez et al. | |
| 2019/0248482 A1 | 8/2019 | Gillett | |

* cited by examiner

SYSTEM AND METHOD FOR OPERATING A MULTI-ENGINE AIRCRAFT

CROSS-REFERENCE TO RELATED APPLICATIONS

This patent application claims priority of U.S. Provisional Application Ser. No. 62/848,237, filed on May 15, 2019, of U.S. Provisional Application Ser. No. 62/848,699, filed on May 16, 2019, and of U.S. Provisional Application Ser. No. 62/852,428, filed on May 24, 2019, the entire contents of which are hereby incorporated by reference.

TECHNICAL FIELD

The present disclosure relates generally to a multi-power plant engine system, and more particularly to a mode of operation of an aircraft.

BACKGROUND OF THE ART

When operating aircraft with multiple engines, there may be certain portions of a mission that do not require both engines to be operating at full power. In cruising conditions, operating a single engine at a relatively high power, instead of multiple engines at lower power, may allow for better fuel efficiency. For example, one or more engine(s) are operated at high power, and one or more remaining engine(s) are operated in what is sometimes referred to as a "standby" mode. However, there can be a delay in powering up a typical aircraft engine operating in the standby mode.

Therefore, improvements are needed.

SUMMARY

In accordance with a broad aspect, there is provided a method for operating a rotorcraft comprising a plurality of engines configured to provide motive power to the rotorcraft and at least one rotor coupled to the plurality of engines. Failure of an active engine of the rotorcraft is detected when the rotorcraft is operated in an asymmetric operating regime (AOR), in which at least one first engine of the plurality of engines is the active engine and is operated in an active mode to provide motive power to the rotorcraft and at least one second engine of the plurality of engines is a standby engine and is operated in a standby mode to provide substantially no motive power to the rotorcraft. At least one flight control input is adjusted to compensate for a reduction in rotational speed of the at least one rotor resulting from the failure of the active engine. An increase in a power output of the standby engine of the rotorcraft is commanded.

In accordance with another broad aspect, there is provided a system for operating a rotorcraft comprising a plurality of engines configured to provide motive power to the rotorcraft and at least one rotor coupled to the plurality of engines. The system comprises a processing unit, and a non-transitory computer-readable medium having stored thereon program instructions executable by the processing unit. The program instructions are executable for: detecting failure of an active engine of the rotorcraft when the rotorcraft is operated in an asymmetric operating regime (AOR), in which at least one first engine of the plurality of engines is the active engine and is operated in an active mode to provide motive power to the rotorcraft and at least one second engine of the plurality of engines is a standby engine and is operated in a standby mode to provide substantially no motive power to the rotorcraft; adjusting at least one flight control input to compensate for a reduction in rotational speed of the at least one rotor resulting from the failure of the active engine; and commanding an increase in a power output of the standby engine of the rotorcraft.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for operating a rotorcraft. Under certain conditions, it can be desirable to operate an aircraft in a so-called "asymmetric operating regime" (AOR) which is described in greater detail hereinbelow. When operated in the AOR, multiple engines of the aircraft, which may be a multi-engine helicopter or other rotorcraft, are operated at different output power levels.

Figure 1A:
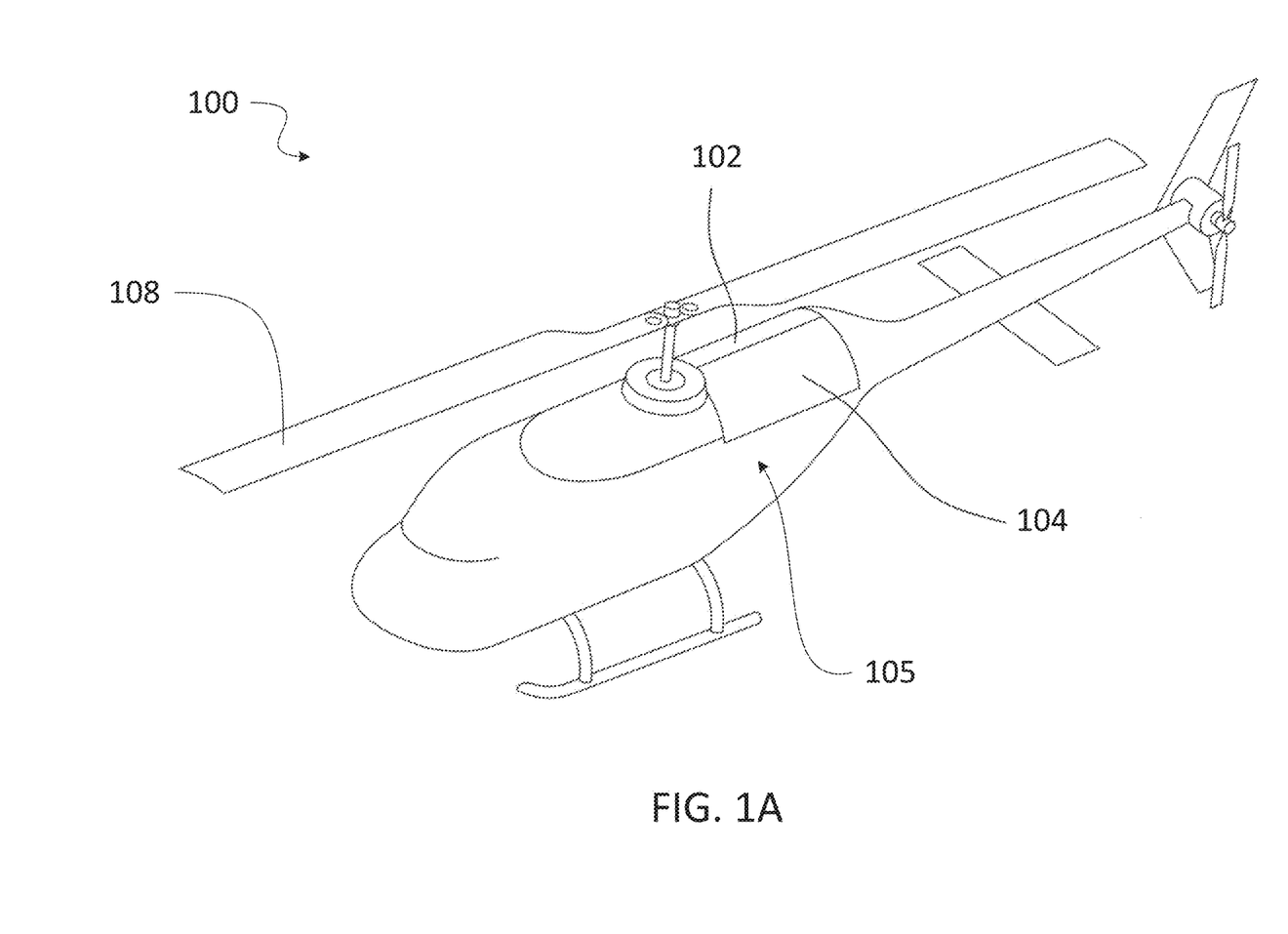
FIG. 1A is a schematic view of a multi-engine aircraft.

FIG. 1A depicts an exemplary multi-engine aircraft 100, which in this case is a helicopter. The aircraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
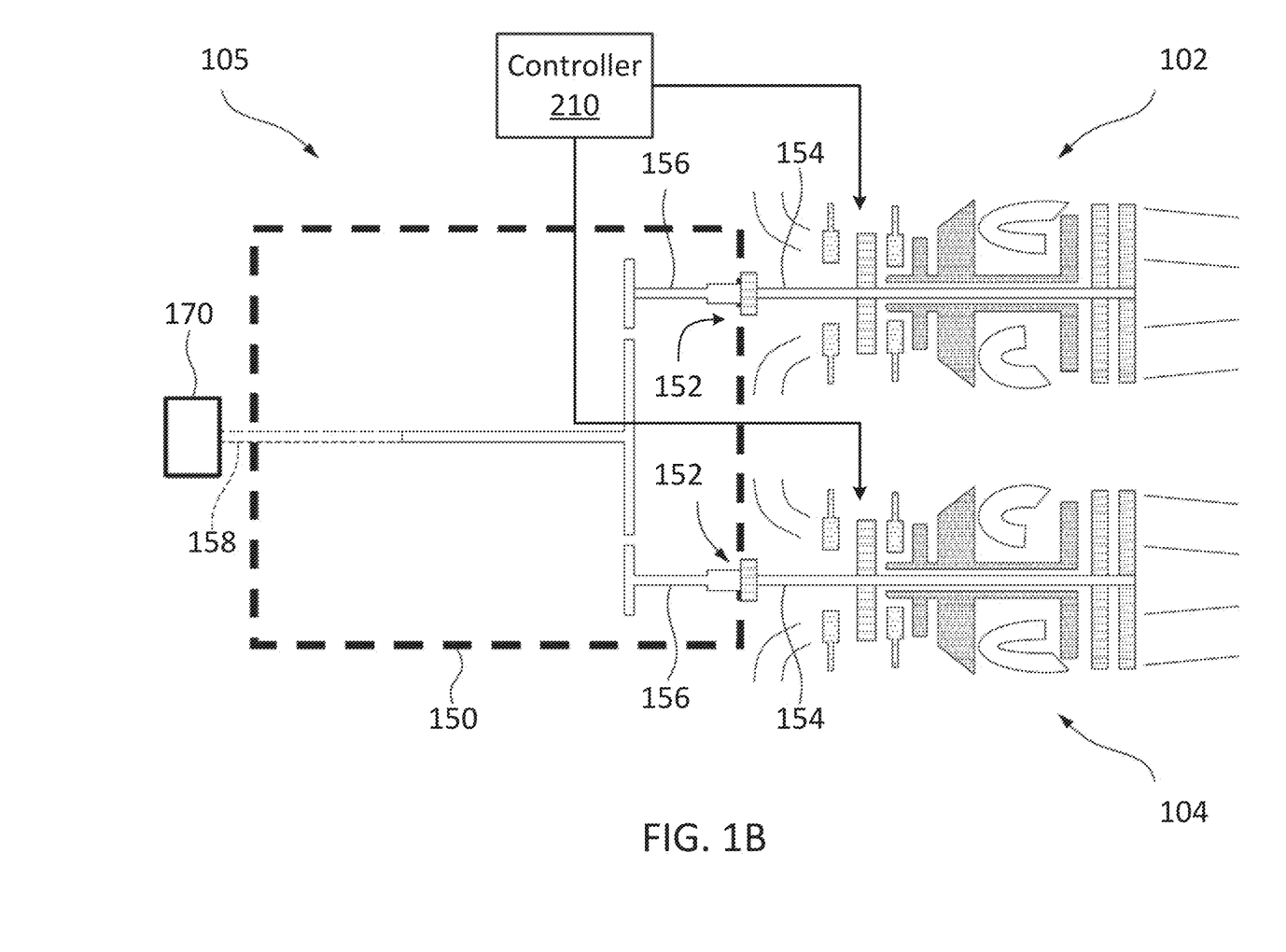
FIG. 1B is a schematic representation of an exemplary multi-engine system for the aircraft of FIG. 1A, showing axial cross-sectional views of two gas turbine engines.

Turning now to FIG. 1B, illustrated is an exemplary multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be FADEC(s), electronic engine controller(s) (EEC(s)), or the like, that are programmed to manage, as described herein below, the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

More particularly, the multi-engine system 105 of this embodiment includes first and second turboshaft engines 102, 104 each having a respective transmission 152 interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of turboshaft engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

In the present description, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or the aforementioned AOR, wherein one of the two engines is operated in a lower-power (which could be no power, in some cases) "standby mode" while the other engine is operated in a high-power "active" mode. Such an asymmetric operation may be engaged for a cruise phase of flight (continuous, steady-state flight which is typically at a given commanded constant aircraft cruising speed and altitude). The multi-engine system 105 may be used in an aircraft, such as the helicopter 100, but also has applications in suitable marine and/or industrial applications or other ground operations.

Referring still to FIG. 1B, according to the present description the multi-engine system 105 is driving in this example the helicopter 100 which may be operated in the AOR, in which a first of the turboshaft engines (say, 102) may be operated at high power in an active mode and the second of the turboshaft engines (104 in this example) may be operated in a lower-power (which could be no power, in some cases) standby mode. In one example, the first turboshaft engine 102 may be controlled by the controller(s) 210 to run at full (or near-full) power conditions in the active mode, to supply substantially all or all of a required power and/or speed demand of the common load 170. The second turboshaft engine 104 may be controlled by the controller(s) 210 to operate at lower-power or no-output-power conditions to supply substantially none or none of a required power and/or speed demand of the common load 170. Optionally, a clutch may be provided to declutch the low-power engine. Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, the AOR of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel low rate difference may be controlled to be in a range of 80% and 90%, with fuel flow to the standby engine being 80% to 90% less than the active engine.

In another embodiment, the controller 210 may operate one engine (say 104) of the multiengine system 105 in a standby mode at a power substantially lower than a rated cruise power level of the engine, and in some embodiments at substantially zero output power and in other embodiments less than 10% output power relative to a reference power (provided at a reference fuel flow). Alternatively still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, AOR is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 102) may operate in the active mode while the other turboshaft engine (say 104) may operate in the standby mode, as described above. During operation in the AOR, if the helicopter 100 needs a power increase (expected or otherwise), the second turboshaft engine 104 may be required to provide more power relative to the low power conditions of the standby mode, and possibly return immediately to a high- or full-power condition. This may occur, for example, in an emergency condition of the multi-engine system 105 powering the helicopter 100, wherein the "active" engine loses power the power recovery from the lower power to the high power may take some time. Even absent an emergency, it will be desirable to repower the standby engine to exit the AOR.

Figure 2:
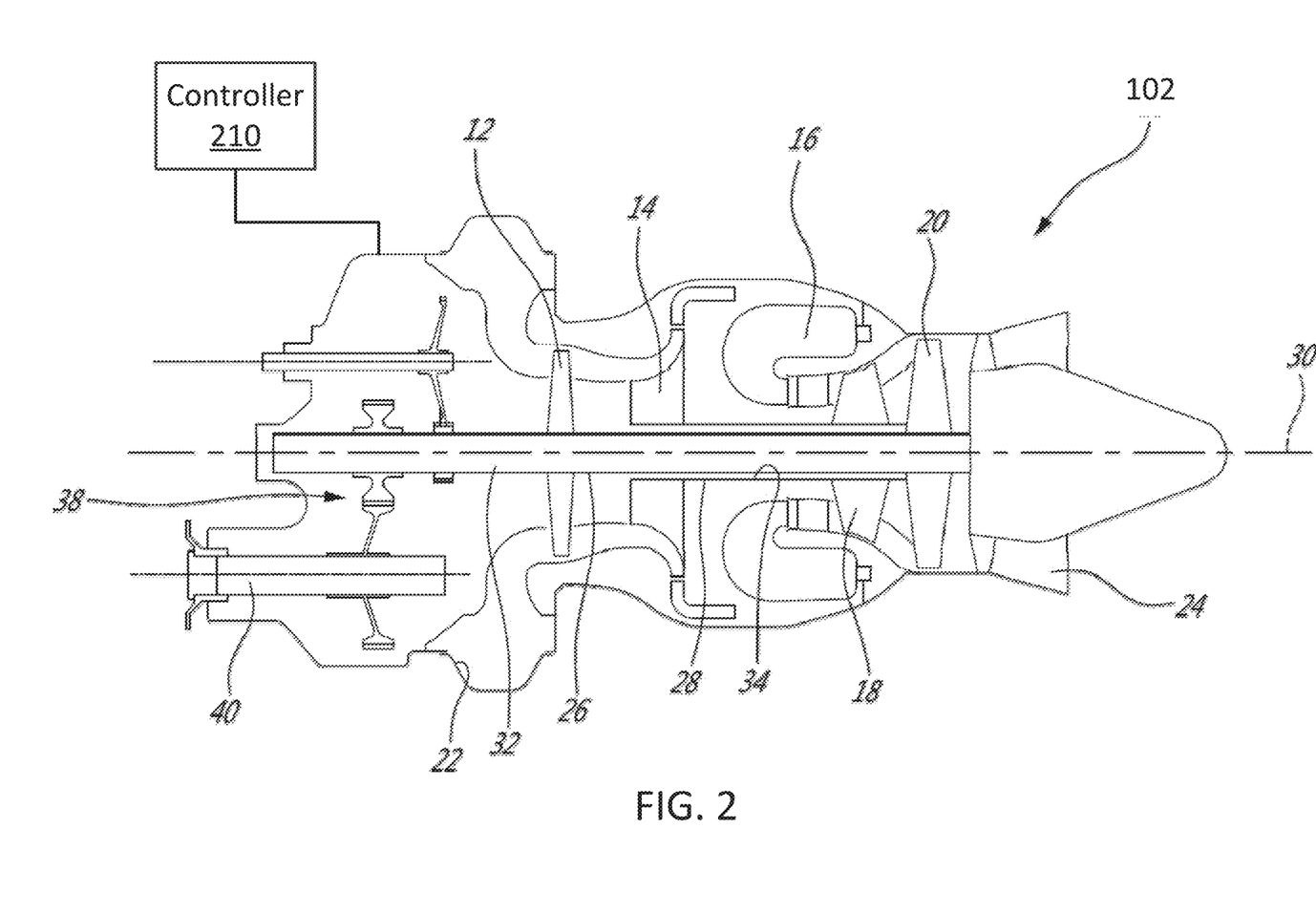
FIG. 2 is a cross-sectional view of an example turboshaft engine of the aircraft of FIG. 1.

With reference to FIG. 2, the turboshaft engines 102, 104 can be embodied as gas turbine engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12, In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

As described hereinabove, control of the operation of the engine 102 can be effected by one or more control systems, for example the controller 210. The controller 210 can modulate a fuel flow rate provided to the engine 102, the position and/or orientation of variable geometry mechanisms within the engine 102, a bleed level of the engine 102, and the like. In some embodiments, the controller 210 is configured for controlling operation of multiple engines, for instance the engines 102 and 104, For example, the controller 210 can be provided with one or more Full Authority Digital Engine Controllers (FADECs) or similar devices. Each FADEC can be assigned to control the operation of one or more of the engines 102, 104. Additionally, in some embodiments the controller 210 can be configured for controlling operation of other elements of the aircraft 100, for instance the main rotor 108.

Figure 3:
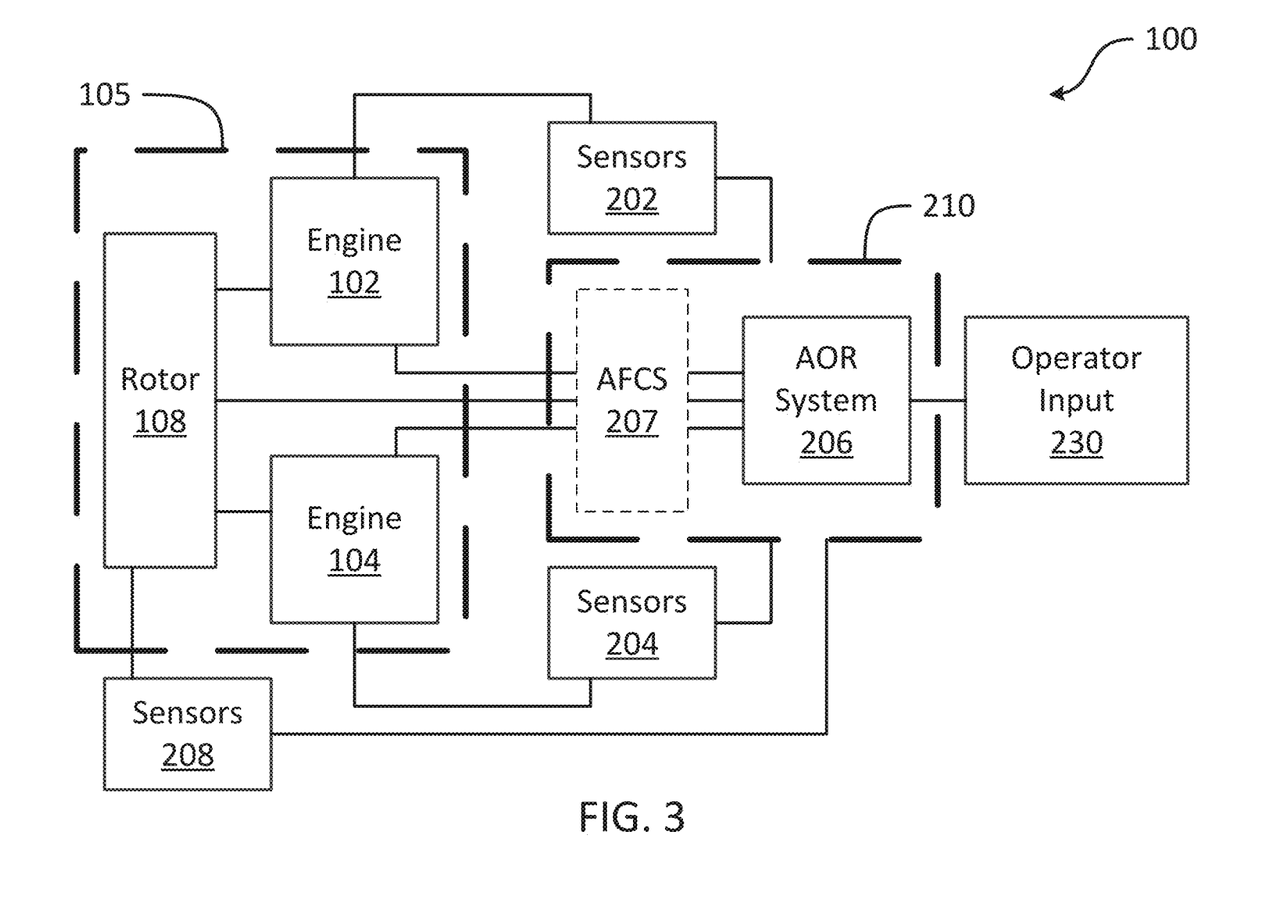
FIG. 3 is a block diagram of an example architecture for operating a rotorcraft.

With reference to FIG. 3, the aircraft 100, comprising the engines 102, 104 and the rotor 108, is illustrated using a block diagram. More than two engines 102, 104 may be present on a same aircraft 100. The engines 102, 104 are mechanically coupled to the main rotor 108, for instance as illustrated in FIG. 1B, for causing the rotor 108 to rotate and produce thrust for the aircraft 100. Collectively, the engines 102, 104, and the rotor 108 form part of the multi-engine system 105, which is controlled by the controller 210. The controller 210 is configured for receiving various instructions from an operator of the aircraft 100, for example via operator input 230, which can include on or more flight control inputs, as described in greater detail hereinbelow.

The multi-engine system 105 can be controlled by way of the controller 210, as described hereinabove. The controller 210 can be composed of various devices, including one or more FADECs, one or more rotor controllers, or any other suitable devices for controlling operation of the engines 102, 104, and/or the rotor 108. In some embodiments, the operation of the engines 102, 104, and of the rotor 108 is controlled by way of one or more actuators, mechanical linkages, hydraulic systems, and the like. The controller 210 can be coupled to the actuators, mechanical linkages, hydraulic systems, and the like, in any suitable fashion for effecting control of the engines 102, 104 and/or of the rotor 108. For example, if a change in the operating conditions of the aircraft 100 is detected without any corresponding change in inputs from an operator of the aircraft 100, the FADEC can adjust the inputs to compensate for the uncommanded change.

One or more sensors 202, 204 are coupled to the engines 102, 104, for acquiring data about the operating parameters of the engines 102, 104. Additionally, sensors 208 are coupled to the rotor 108 for acquiring data about the operating parameters of the rotor 108. The sensors 202, 204, 208 may be any suitable type of sensor used to measure operating parameters including, but not limited to, speed sensors, acceleration sensors, pressure sensors, temperature sensors, altitude sensors, and the like. The sensors 202, 204, 208, can be coupled to the controller 210 in any suitable fashion, including any suitable wired and/or wireless coupling techniques.

The controller 210 can be provided with an AOR system 206 which is configured to control operation of the engines 102, 104, and of the rotor 108, when the aircraft 100 is operating in the AOR. In certain embodiments, prior to entry into, or exit from, the AOR, it is desirable for various operating parameters for the engines 102, 104, and/or for the rotor 108, to be within predetermined bands and/or at, below, or above certain predetermined values. In some embodiments, when operating in the AOR, one of the engines, for example engine 102, is set as the so-called "active engine", and the other engine(s), in this example engine 104, is/are set as the so-called "standby engine". It should be noted that the association between engines 102, 104 and the active/standby status is solely for the purposes of example.

As described hereinabove, when operating in the AOR, the active engine (engine 102) and the standby engine (engine 104) are operated at different output power levels. In the course of operation in the AOR, it can occur that the active engine 102 experiences an engine failure event. For example, the active engine 102 can experience a mechanical failure rendering the engine 102 inoperative. Alternatively, a failure of part or all of the controller 210 can render the engine 102 inoperative. Still other types of engine failure events are considered. When the active engine 102 experiences an engine failure event, the aircraft 100 relies on the standby engine 104 to provide power to keep the aircraft 100 airborne. However, because the standby engine 104 is operated at a lower power setting than the active engine 102 when in the AOR, the standby engine 104 may not be able to immediately achieve a power level suitable for providing sufficient power to keep the aircraft 100 airborne. For example, sudden loss of power within the multi-engine system 105 can cause the rotor 108 to experience a reduction in rotational speed, sometimes referred to as rotor droop. In certain cases of significant rotor droop, the blades of the rotor 108 can bend upwards due to downward motion of the aircraft 100, and in certain circumstances can result in one or more blades of the rotor 108 breaking, for instance during significant rotor droop.

In order to compensate for the lack of power produced by the multi-engine system 105, and to account for the ramp-up time that may be required for the standby engine 104 to reach a suitable power level, the controller 210 can be configured for mitigating the failure of the active engine 102, which results in reduction of rotational speed of the rotor 108, or rotor droop. For instance, the controller 210 can implement one or more countermeasures to compensate for rotor droop, including to reduce or mitigate the amount of rotor droop experienced by the rotor 108. Other steps for mitigating failure of the active engine 102 are also considered.

The AOR system 206 can detect failure of the active engine 102, in some embodiments via data acquired from the sensors 202 and/or 208, For example, the sensors 202 can provide data indicative of a change in the output power level of the active engine 102, a deceleration of the active engine 102, and/or other parameters indicative of failure of the active engine 102. In another example, the sensors 208 can provide data indicative in a change in the speed of the rotor 108, a change in the power supplied to the rotor 108, a deceleration of the rotor 108, and/or other parameters indicative of failure of the active engine 102. The AOR system 206 can be configured for substantially continuously monitoring various operating parameters of the active engine 102 and/or of the rotor 108, obtained from the sensors 202, 208, to detect when the active engine 102 experiences an engine failure event.

For example, the AOR system 206 can determine the occurrence of an engine failure event for the active engine 102 by detecting a negative acceleration for the active engine 102 beyond an acceleration threshold. In another example, the AOR system 206 can determine the occurrence of an engine failure event for the active engine 102 by detecting a reduction in the output power level of the active engine 102 below a power threshold. In a further example, the AOR system 206 can determine the occurrence of an engine failure event for the active engine 102 by detecting a change in altitude, airspeed, or other operating parameter of the aircraft 100. Other approaches are also considered. The threshold values can be any suitable value, and in some cases can be dynamically assess based on operating conditions for the aircraft 100.

In some further embodiments, the active engine 102 includes one or more self-diagnostic modules, which can report to the controller 210 when the active engine 102 experiences an engine failure event. The self-diagnostic modules can use any suitable analog or digital communication means for reporting failure of the active engine 102 to the AOR system 206 and/or to the controller 210. Other approaches and techniques for detecting failure of the active engine are also considered.

As a result of the failure of the active engine 102, the rotor 108 will experience rotor droop; that is to say, the rotational speed of the rotor 108 will decrease. In order to compensate for the rotor droop, the AOR system 206 is also configured for, following or responsive to detection of the failure of the active engine 102, compensating for the reduction in rotational speed of the rotor 108, which can assist in mitigating the failure of the active engine 102. For example, the AOR system 206 can adjust, or cause to be adjusted, one or more flight control inputs to the aircraft 100, which form part of the operator inputs 230.

In some embodiments, the AOR system 206 adjusts one or more of the flight control inputs to causes an adjustment in an effective blade angle of the blades of the rotor 108. For example, the pitch of the blades of the rotor 108 can be directly adjusted. In another example, the pitch of the aircraft 100 can be adjusted (e.g. lowers the pitch angle of a nose of the aircraft 100), which results in a change of the effective blade angle of the blades of the rotor 108. By adjusting the flight control inputs, for instance to adjust the effective blade angle of the blades of the rotor 108, the deceleration of the rotor 108—caused by the engine failure event experienced by the active engine 102—can be reduced or stopped until the standby engine 104 reaches a power level suitable for providing sufficient power to the aircraft 100.

In some embodiments, the AOR system 206 effects the adjustment in the flight control input(s) of the aircraft 100 using an optional automatic flight control system (AFCS) 207 of the controller 210. The AFCS 207 can be configured for adjusting one or more flight control inputs acquired from the operator input 230. The operator input 230 can include a collective lever input, a cyclic input, a pedal input, and/or any other suitable inputs for controlling operation of the aircraft 100. In some embodiments, the AFCS 207 can adjust the inputs by way of mechanical linkages, actuators, or the like, which adjust the position and/or orientation of various surfaces and mechanical machines. In other embodiments, the AFCS 207 can adjust analog or digital signals transmitted to actuators or other devices which control operation of the engines 102, 104, and/or of the rotor 108. Other approaches are also considered.

For example, the blade angle of the blades of the rotor 108 can be adjusted via the AFCS 207 by adjusting the collective lever input of the aircraft 100. The collective lever can be adjusted so that the blade angle of the blades of the rotor 108 produce less drag, thereby reducing the amount of rotor droop experienced by the aircraft 100. In another example, the pitch angle of the aircraft 100 can be adjusted, which results in a change in the effective blade angle of the blades of the rotor 108 (that is to say, vis-à-vis the direction of travel of the aircraft 100). The pitch angle of the aircraft 100 can be adjusted via the AFCS 207 by adjusting the cyclic lever input of the aircraft 100. Still other embodiments, including making one or more adjustments to the pedal input of the aircraft 100, are considered.

The AOR system 206 can also command an increase in the power output of the standby engine 104. In some embodiments, the AOR 206 commands the increase in the power output of the standby engine 104 substantially simultaneously with reducing the power demand for the aircraft 100. In some other embodiments, the AOR 206 commands the increase in the power output of the standby engine 104 subsequently to reducing the power demand for the aircraft 100.

The AOR system 206 can cause the increase in the power output of the standby engine 104 in any suitable fashion, including mechanically, electrically, and/or digitally. In some embodiments, the AOR system 206, and/or the AFCS system 207, command the increase in the power output of the standby engine 104 by way of one or more mechanical linkages or actuators. In other embodiments, the AOR system 206, and/or the AFCS system 207, adjust one or more analog electrical signals or modify one or more digital signals issued to the engine 104 to command the increase in the power output of the standby engine 104. Other embodiments are also considered.

Figure 4A:
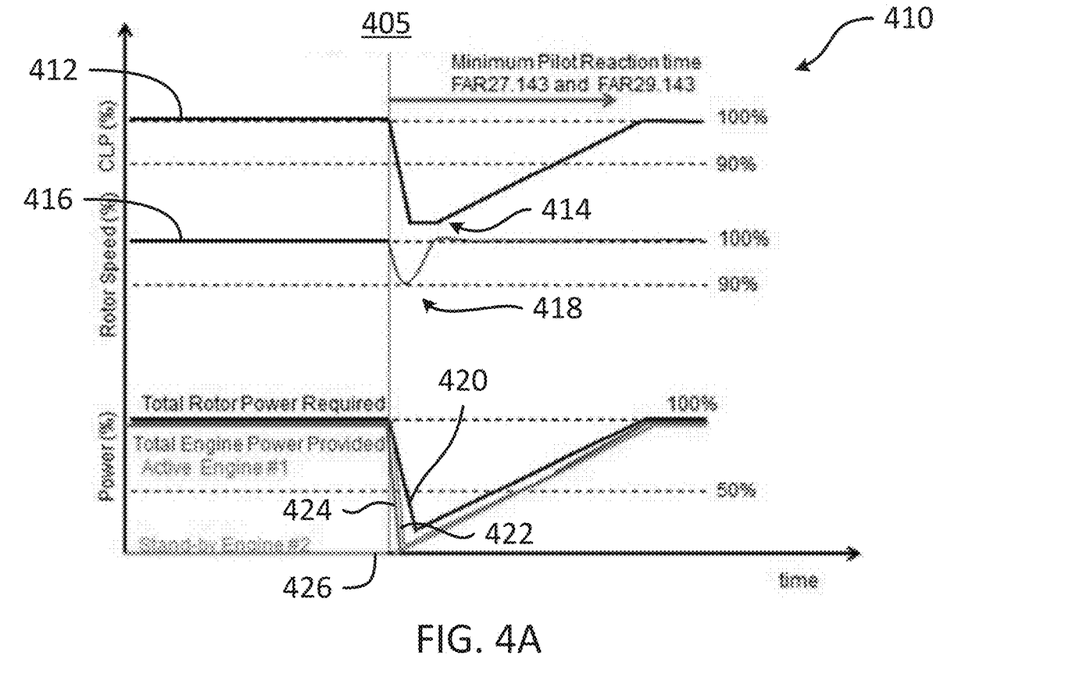
FIGS. 4A-B are graphical illustrations of example approaches for operating a rotorcraft.

With reference to FIG. 4A, there is shown a graphical representation of an approach 410 for mitigating active engine failure when the aircraft 100 is operating in the AOR. Line 412 illustrates the collective lever input as a percentage of a maximum input value; line 416 represents the speed of the rotor 108 as a percentage of a maximum rotating speed; and line 420 represents the total rotor power required.

Following failure of the active engine 102 at time 405, the rotor speed 416 begins to drop, forming trough 418. To compensate for the rotor droop experienced by the rotor 108, the AOR system 206 can decrease the collective lever input 412, illustrated at trough 414. By adjusting the collective lever input 412, the rotor speed 416 increases out of the trough 418, and returns to the pre-engine-failure value. In addition, the AOR system 206 can command an increase in the power output of the standby engine 104, represented by line 426. As the power output 426 of the standby engine 104 increases, the AOR system 206 can gradually increase the collective lever input 412 to return the collective lever input 412 to the pre-engine-failure value.

Figure 4B:
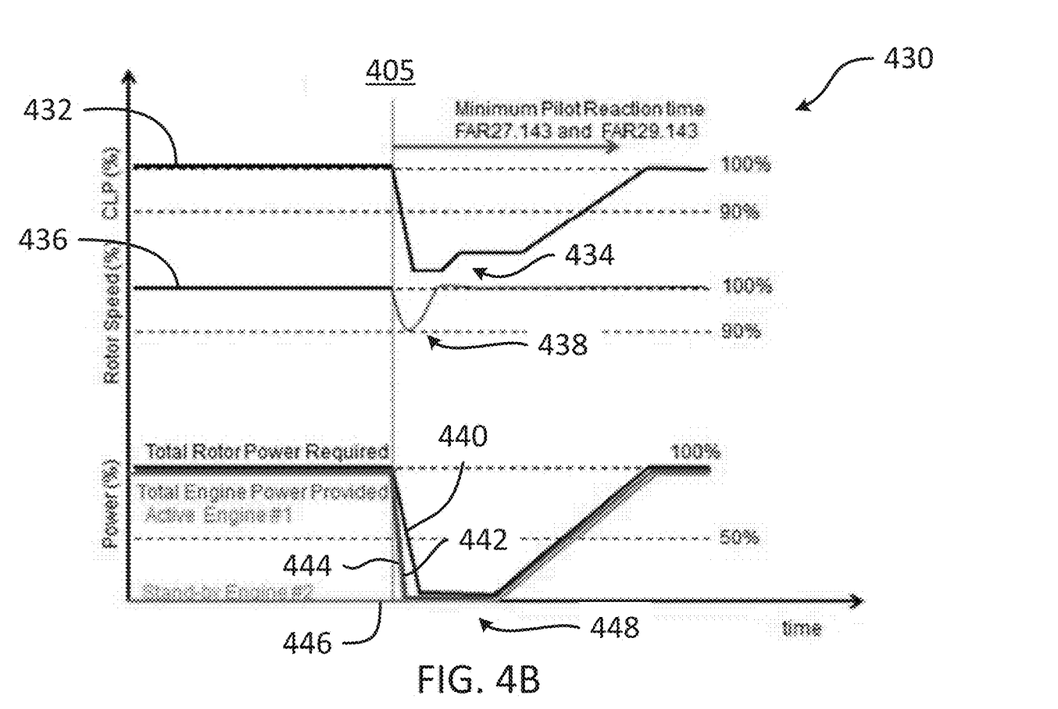

With reference to FIG. 4B, there is shown a graphical representation of an alternative approach 430 for mitigating active engine failure when the aircraft 100 is operating in the AOR. Line 432 illustrates the collective lever input as a percentage of a maximum input value; line 436 represents the speed of the rotor 108 as a percentage of a maximum rotating speed; and line 440 represents the total rotor power required.

At time 405, the active engine 102 experiences an engine failure event. Line 444, which represents the power provided by the active engine 102, illustrates the loss of power due to failure of the active engine 102. Line 442 represents the total power provided by the engines 102, 104; which also drops due to failure of the active engine 102. The AOR system 206 can detect failure of the active engine and attempt to mitigate this failure.

Following failure of the active engine 102 at time 405, the rotor speed 436 begins to drop, forming trough 438. To compensate for the rotor droop experienced by the rotor 108, the AOR system 206 can decrease the collective lever input 432, which in this approach 430 takes the form of dual-level trough 434. By adjusting the collective lever input 432, the rotor speed 436 increases out of the trough 438, and returns to the pre-engine-failure value. Although shown here as a dual-level trough 434, it should be understood that other approaches can use tri-level troughs, or other step-based functions, as appropriate.

The dual-level trough 434 can be employed in cases where a significant amount of time is required to accelerate the standby engine 104, as illustrated by trough 448. For example, if the amount of time is more than a few seconds, or more than a few fractions of a second, a longer trough, like dual-level trough 434, can be employed to give additional time for the standby engine 104 to accelerate. For example, this approach 430 can be employed when the standby engine 104 is in a shutdown or very-low idle state. In addition, the AOR system 206 can command an increase in the power output of the standby engine 104, represented by line 446. As the power output 446 of the standby engine 104 increases; the AOR system 206 can gradually increase the collective lever input 432 to return to the pre-engine-failure level. Other approaches are also considered.

In some embodiments, the controller 210, and/or the AOR system 206, is configured for dynamically selecting the particular adjustments to be made to the flight control input(s) for the aircraft 100 based on operating parameters of the engine 100. For instance, the altitude of operation of the aircraft 100, the ambient temperature of the environment in which the aircraft 100 is operating, and the like, can influence the way in which the AOR system 206 adjusts the flight control input(s).

Figure 5:
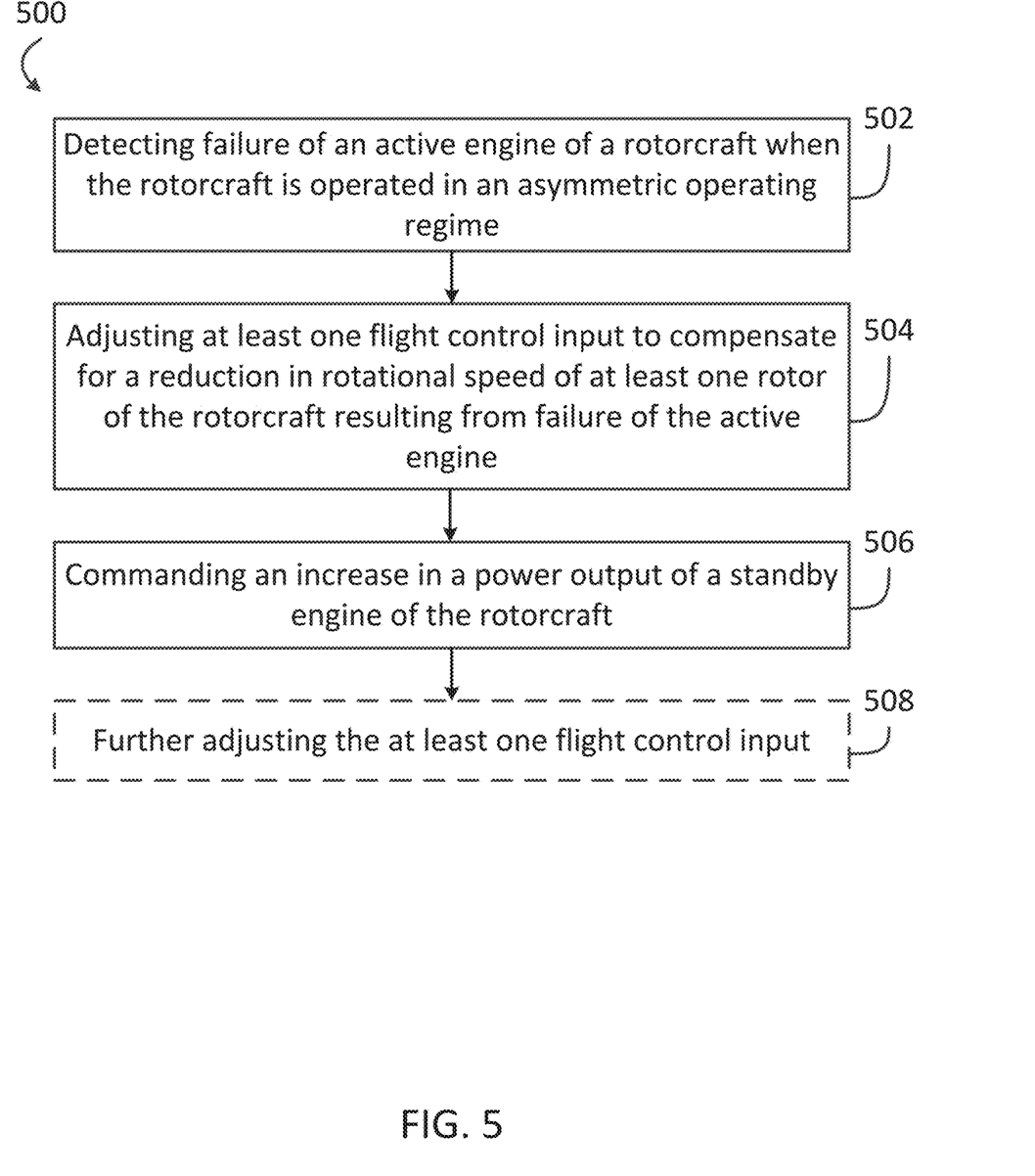
FIG. 5 is a flowchart of an example method for operating a rotorcraft.

With reference to FIG. 5, there is shown a flowchart illustrating a method 500 for operating an aircraft, for instance the aircraft 100. In some embodiments, the aircraft 100 is a rotorcraft, for instance a helicopter, which can comprise a plurality of engines which are configured to provide motive power to the rotorcraft, and at least one rotor coupled to the plurality of engines, for example the rotor 108.

At step 502, failure of the active engine 102 during operation in the AOR is detected. Detection of the active engine 102 experiencing an engine failure event can be performed in any suitable fashion, including based on changes in the output power or acceleration of the active engine 102, and/or based on changes in the speed or acceleration of the rotor 108, and the like.

At step 504, at least one flight control input is adjusted to compensate for a reduction in the rotational speed of the rotor 108, which results from failure of the active engine 102. The flight control input(s) are adjusted to increase the rotational speed of the rotor 108 so that the rotor 108 rotates at substantially the same speed as before the failure of the active engine 102. For example, the flight control input(s) can be adjusted to change the effective blade angle of the blades of the rotor 108, for instance by adjusting the blade angle of the blades directly, by adjusting the pitch of the aircraft 100, or in any other suitable way. Other approaches are also considered.

At step 506, an increase in the power output of the standby engine 104 is commanded. In some embodiments, the increase in the power output of the standby engine 104 is commanded via an AFCS system of the aircraft 100, for instance the AFCS system 207. The increase in the power output of the standby engine 104 can be commanded mechanically, electrically, digitally, or in any other suitable fashion.

Optionally, at step 508, further adjustments to the flight control input(s) are made, for example concurrently with the increase in the power output of the standby engine 104. For instance, the flight control input(s) can be reverted back to their pre-engine-failure values. The further adjustments to the flight control input(s) can be performed substantially instantaneously, gradually, or in any other suitable fashion.

In some embodiments, the method 500 is performed by the FADEC of the aircraft 100, or any other suitable engine electronic controller, which can implement part or all of the controller 210. In some embodiments, a portion of the method 500 is performed by the FADEC or other suitable engine electronic controller.

Figure 6:
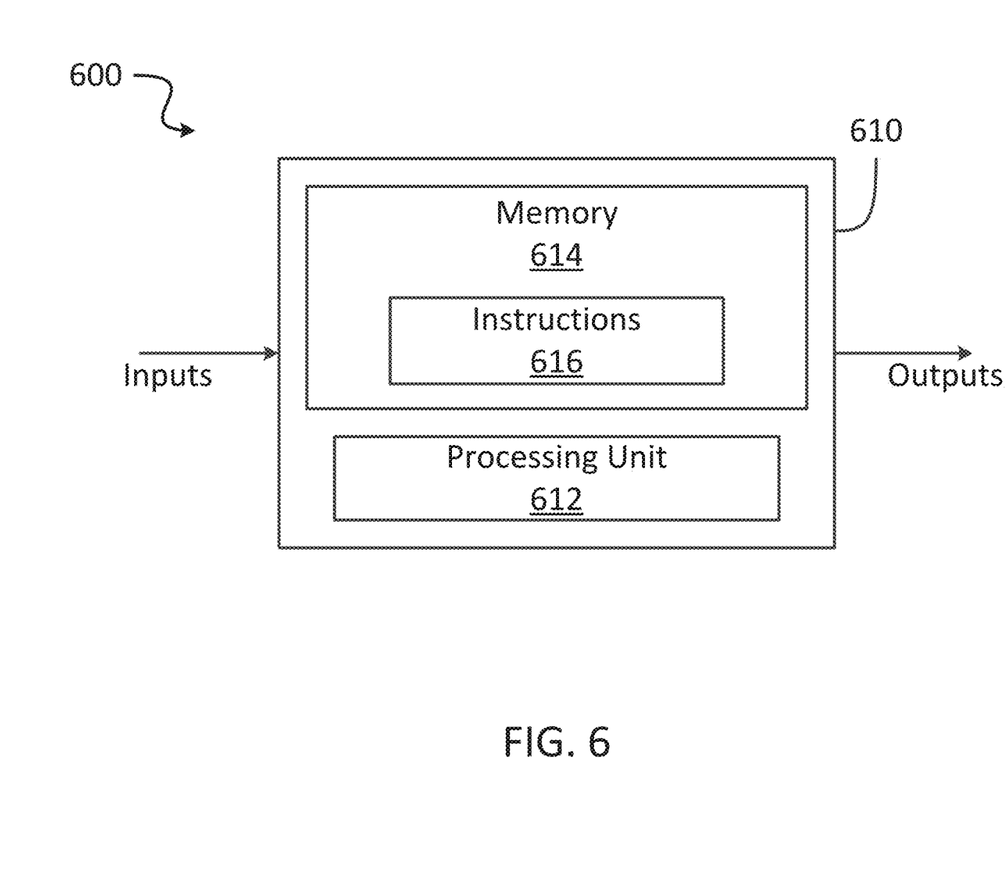
FIG. 6 is a block diagram of an example computing device for implementing the method of FIG. 5.

With reference to FIG. 6, the method 500 may be implemented by a computing device 610, which can embody part or all of the controller 210, the AOR system 206, and/or the AFCS system 207. The computing device 610 comprises a processing unit 612 and a memory 614 which has stored therein computer-executable instructions 616. The processing unit 612 may comprise any suitable devices configured to implement the functionality of the AOR system 206 and/or the functionality described in the method 500, such that instructions 616, when executed by the computing device 610 or other programmable apparatus, may cause the functions/acts/steps performed by the AOR system 206 and/or described in the method 500 as provided herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

The methods and systems for operating a rotorcraft as described herein may be implemented in a high level procedural or object oriented programming or scripting language, or a combination thereof, to communicate with or assist in the operation of a computer system, for example the computing device 610. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 612 of the computing device 610, to operate in a specific and pre-defined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure, Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a rotorcraft comprising a plurality of engines configured to provide motive power to the rotorcraft and at least one rotor coupled to the plurality of engines, the method comprising:
   detecting failure of an active engine of the rotorcraft when the rotorcraft is operated in an asymmetric operating regime (AOR), in which at least one first engine of the plurality of engines is the active engine and is operated in an active mode to provide motive power to the rotorcraft and at least one second engine of the plurality of engines is a standby engine and is operated in a standby mode to provide substantially no motive power to the rotorcraft;
   adjusting at least one flight control input to compensate for a reduction in rotational speed of the at least one rotor resulting from the failure of the active engine; and
   commanding an increase in a power output of the standby engine of the rotorcraft.

2. The method of claim 1, further comprising, responsive to commanding the increase in the power output of the standby engine, further adjusting the at least one flight control input.

3. The method of claim 1, wherein adjusting at least one flight control input to compensate for the reduction in rotational speed of the at least one rotor comprises adjusting a blade angle of a plurality of blades of the rotor.

4. The method of claim 3, wherein adjusting the blade angle of the plurality of blades of the rotor comprises adjusting a collective lever input of the rotorcraft.

5. The method of claim 1, wherein adjusting at least one flight control input to compensate for the reduction in rotational speed of the at least one rotor comprises adjusting a pitch angle of the rotorcraft.

6. The method of claim 5, wherein adjusting the pitch angle of the rotorcraft comprises adjusting a cyclic input of the rotorcraft.

7. The method of claim 1, wherein adjusting at least one flight control input comprises adjusting a pedal input of the rotorcraft.

8. The method of claim 1, wherein adjusting the at least one flight control input comprises commanding an automatic flight control system (AFCS) of the rotorcraft to adjust the at least one flight control input.

9. The method of claim 1, wherein detecting the failure of the active engine comprises detecting a negative acceleration for the active engine beyond an acceleration threshold.

10. The method of claim 1, wherein detecting the failure of the active engine comprises detecting a reduction in the speed of the active engine below a speed threshold.

11. A system for mitigating active engine failure in an rotorcraft comprising a plurality of engines configured to provide motive power to the rotorcraft and at least one rotor coupled to the plurality of engines, the system comprising:
a processing unit; and
a non-transitory computer-readable medium having stored thereon program instruction executable by the processing unit for:
detecting failure of an active engine of the rotorcraft when the rotorcraft is operated in an asymmetric operating regime (AOR), in which at least one first engine of the plurality of engines is the active engine and is operated in an active mode to provide motive power to the rotorcraft and at least one second engine of the plurality of engines is a standby engine and is operated in a standby mode to provide substantially no motive power to the rotorcraft;
adjusting at least one flight control input to compensate for a reduction in rotational speed of the at least one rotor resulting from the failure of the active engine; and
commanding an increase in a power output of the standby engine of the rotorcraft.

12. The system of claim 11, wherein the program instructions are further executable for, responsive to commanding the increase in the power output of the standby engine, further adjusting the at least one flight control input.

13. The system of claim 11, wherein adjusting at least one flight control input to compensate for the reduction in rotational speed of the at least one rotor comprises adjusting a blade angle of a plurality of blades of the rotor.

14. The system of claim 13, wherein adjusting the blade angle of the plurality of blades of the rotor comprises adjusting a collective lever input of the rotorcraft.

15. The system of claim 11, wherein adjusting at least one flight control input to compensate for the reduction in rotational speed of the at least one rotor comprises adjusting a pitch angle of the rotorcraft.

16. The system of claim 15, wherein adjusting the pitch angle of the rotorcraft comprises adjusting a cyclic input of the rotorcraft.

17. The system of claim 11, wherein adjusting at least one flight control input comprises adjusting a pedal input of the rotorcraft.

18. The system of claim 11, wherein adjusting the at least one flight control input comprises commanding an automatic flight control system (AFCS) of the rotorcraft to adjust the at least one flight control input.

19. The system of claim 11, wherein detecting the failure of the active engine comprises detecting a negative acceleration for the active engine beyond an acceleration threshold.

20. The system of claim 11, wherein detecting the failure of the active engine comprises detecting a reduction in the speed of the active engine below a speed threshold.

* * * * *